United States Patent
Border

(10) Patent No.: US 9,942,895 B2
(45) Date of Patent: Apr. 10, 2018

(54) BURST GROUPING WITH REDUCED OVERHEAD

(71) Applicant: Hughes Network Systems, LLC, Germantown, MD (US)

(72) Inventor: John Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 164 days.

(21) Appl. No.: 14/814,782

(22) Filed: Jul. 31, 2015

(65) Prior Publication Data

US 2017/0033902 A1 Feb. 2, 2017

(51) Int. Cl.
| | | |
|---|---|---|
| *H04W 4/00* | (2009.01) | |
| *H04W 72/04* | (2009.01) | |
| *H04W 28/06* | (2009.01) | |

(52) U.S. Cl.
CPC ....... *H04W 72/0446* (2013.01); *H04W 28/06* (2013.01)

(58) Field of Classification Search
CPC .................................................. H04B 7/212
USPC .......................... 370/328–347; 455/411, 423
See application file for complete search history.

(56) References Cited

U.S. PATENT DOCUMENTS

| 8,619,974 | B2 | 12/2013 | Fang et al. | |
|---|---|---|---|---|
| 8,683,292 | B2 | 3/2014 | Lee et al. | |
| 2003/0223361 | A1* | 12/2003 | Hussain | H04L 43/026 370/230 |
| 2008/0052603 | A1* | 2/2008 | Wiatrowski | H03M 13/09 714/776 |
| 2013/0288643 | A1* | 10/2013 | Panpaliya | H04L 1/0061 455/411 |

* cited by examiner

*Primary Examiner* — Iqbal Zaidi
(74) *Attorney, Agent, or Firm* — Bejin Bienerman PLC

(57) ABSTRACT

In a telecommunication system, a gateway receives a first burst packet and a second burst packet, both encoded with a unique word associated with a color, a value, and an associated time slot. The gateway associates the second burst packet to the first burst packet based on the color and value associated with the unique word used to encode the second burst packet and a received time slot at which the second burst packet is received. A terminal generates the burst packets by generating the first burst packet with a group header and the second burst packet without the group header, encoding the first burst packet and the second burst packet with the unique word, and transmitting the encoded first burst packet and the encoded second burst packet to the gateway.

20 Claims, 6 Drawing Sheets

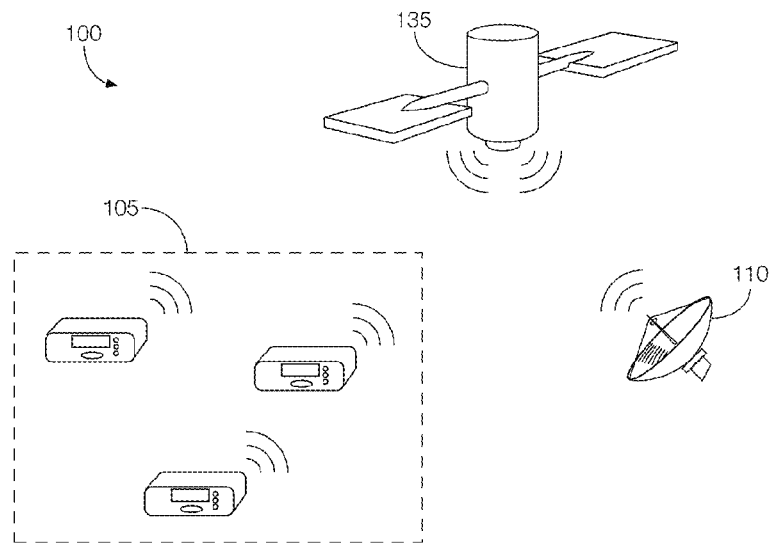
FIGURE 1
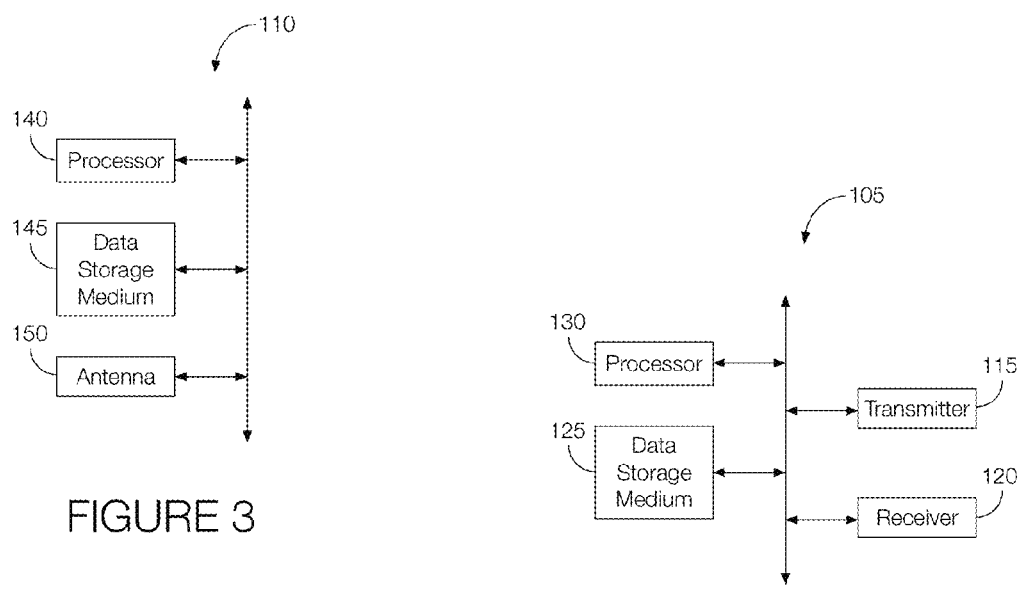
FIGURE 3
FIGURE 2

BURST GROUPING WITH REDUCED OVERHEAD

BACKGROUND

Wireless communication protocols include Time Division Multiple Access (TDMA), Code Division Multiple Access (CDMA), and Scramble Code Multiple Access (SCMA). TDMA generally allows multiple terminals to communicate with a receiver at a particular frequency but at different times to avoid or minimize interference. CDMA generally allows multiple terminals to communicate with a receiver over a single channel using a spread-spectrum technique and coding scheme. SCMA involves allowing different terminals, sharing a bandwidth, to communicate with a receiver by using specific scrambling sequences.

BRIEF DESCRIPTION OF THE DRAWINGS

FIG. 1 illustrates an example telecommunication system having a gateway and multiple terminals.

FIG. 2 is a block diagram showing example components of one of the terminals.

FIG. 3 is a block diagram showing example components of the gateway.

DETAILED DESCRIPTION

Figure 4:
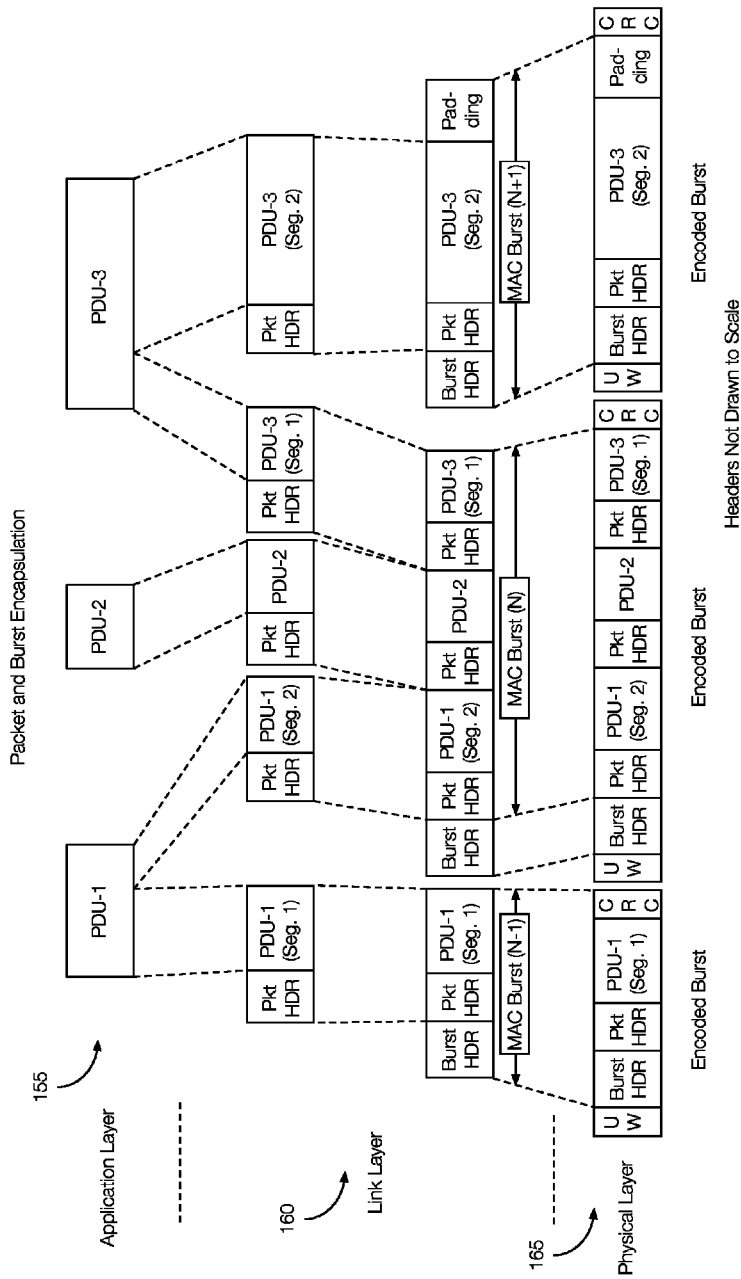
FIG. 4 is a diagram illustrating example packet and burst encapsulation.

In a burst transmission system, traditionally, application protocol data units (PDUs) are encapsulated in link layer packets which are in turn encapsulated in physical layer bursts. At each encapsulation layer, header overhead is introduced so that when the bursts are received, the receiver can correctly recreate the packets from the burst payloads and the PDUs from the packet payloads. When the burst size is relatively small, the number of headers required increases, which in turn increases the overhead of the encapsulation and, thus, reduces the number of application bytes which can be carried. As discussed in greater detail below, with certain communication protocols, such as SCMA, the burst header overhead can be shared across bursts, and the size of the group header is more than offset by the burst header savings.

Reducing overhead is beneficial, and especially important when sending small bursts via unallocated channels. For smaller bursts, more bursts are needed to deliver the same number of payload bytes as can be delivered by larger bursts. Thus, the burst header overhead is replicated more often. And, extra packet overhead is required because the same PDU gets split into more pieces. In addition, per burst overhead for bursts sent via an unallocated channel (such as TDMA ALOHA or SCMA) is considerably larger than the overhead associated with allocated channels. When the channel is allocated, the bandwidth allocator knows who it assigned the burst to. But, because multiple terminals may access an unallocated channel at the same time, the burst headers for an unallocated channel must include extra information, e.g. at a minimum, an identifier for the terminal. Thus, there is significant burst overhead associated with sending unallocated small bursts. By using the group burst concept, the per burst overhead for the small unallocated bursts can be spread over multiple bursts. The larger the set of bursts grouped together, the less overhead.

The Group Burst headers can be used by the receiver to link together the bursts to recreate the original link layer packet. In one possible approach, a random number (i.e. a nonce) can be used. The same nonce may be included in each burst of the group burst and the receiver may match the bursts together via the combination of burst proximity and the nonce. The more proximity used, the smaller (in bits) the nonce can be, further reducing overhead. Requiring that the bursts of the group burst be transmitted back to back limits the required size of the nonce to a byte or two.

In some instances, it may be possible to use characteristics of the physical layer to take the place of the nonce. Scrambled Coded Multiple Access (SCMA) is an example of a physical layer where this is true. SCMA includes a coloring scheme for assigning unique words (UWs) to bursts. The same UW can be used in each burst of a group burst. SCMA also makes use of temporal differences in burst arrivals to identify bursts. The combination of UW color, UW value, and timing offset can be used as the "nonce" to recognize the bursts which are part of a group burst without replicating the group burst header in each burst, further reducing overhead.

The group burst header may include the following fields: (1) a length or size indication, (2) a nonce value or some other mechanism for linking the bursts of the group bursts together, and (3) an optional cyclic redundancy check (CRC) value. The length/size indication may be used by the receiver to determine when or if it has received all of the bursts in the group burst. The nonce value may be used by the receiver to determine which bursts belong to the same group burst. As discussed above, this field may be implied by characteristics of the physical layer. An example of doing this with SCMA coloring is described below. The CRC value may be used to allow the receiver to determine that it has correctly reconstructed the individual bursts into the original link layer burst. Its use is optional to save overhead in the event that it is possible to do this via CRC checks, etc., which may occur at the physical layer or at the point when the packets are used to reconstruct the PDUs. No CRC is included with the SCMA variant.

Certain SCMA-specific implementations are described below. Certain content, such as most of the error handling, is omitted for brevity, however. Both the terminal and gateway are discussed. The terminal may determine that it has user traffic, system messages, control messages, or the like, which need to be sent via SCMA to the gateway. The terminal may determine the size of the group burst to be sent based on, e.g., (1) the size of SCMA bursts, (2) the total amount of payload bytes which need to be sent, (3) the maximum allowed size of a group burst at this point in time, etc. The latter may be determined by several factors including, but not limited to, the current level of SCMA congestion. The terminal may select a UW from the set of UWs associated with the color of the SCMA burst slot in which the first burst of the group burst will be transmitted. This same UW may be used for every burst of the group burst. The terminal may further select a random timing offset from within a configurable range (e.g. +/−64 symbols) to use when transmitting the bursts of the group bursts. The same timing offset may be used for each burst of the group burst. The terminal may further transmit the bursts of the group burst in back-to-back SCMA burst slots, starting with the slot associated with the UW color used.

At the gateway, for each new burst, the gateway checks to see if the UW color of the burst equals the assigned SCMA burst color for that SCMA burst slot. If it does, the gateway may determine that a new group burst is being received and that there is a group burst header in the burst. The gateway may extract the length and size from the group burst header so that it knows how many more bursts it needs to receive for this group burst. And, the gateway may save the payload of the burst as the first piece of the group burst. If, however, the UW color of the burst does not match the assigned SCMA burst color for the SCMA burst slot, then the gateway may determine that this burst belongs to a group burst which is already in the process of being received at the gateway. Using the combination of specific UW received and the timing offset of the burst, the gateway may determine to which group burst this burst belongs. The burst's payload may be added to the end of the group burst received so far. If this is the last burst of the group burst, the gateway may check and process the reassembled link layer burst as if it was received as a single transmission. If this is not the last burst of the group burst, the gateway may continue waiting for the rest of the group burst.

In other words, one way to implement this concept is by coordinating communication between the gateway and the terminals to send and receive burst packets with reduced overhead. An example gateway receives a first burst packet and a second burst packet, both encoded with a unique word associated with a color, a value, and an associated time slot. The gateway associates the second burst packet to the first burst packet based on the color and value associated with the unique word used to encode the second burst packet and a received time slot at which the second burst packet is received. An example terminal generates the burst packets by generating the first burst packet with a group header and the second burst packet without the group header, encoding the first burst packet and the second burst packet with the unique word, and transmitting the encoded first burst packet and the encoded second burst packet to the gateway. The concept can be incorporated into an SCMA telecommunication scheme, among others, to, e.g., carry user data for purposes of reducing latency for encrypted web browsing more efficient and practical thereby decreasing latency and improving user traffic.

The elements shown may take many different forms and include multiple and/or alternate components and facilities. The example components illustrated are not intended to be limiting. Indeed, additional or alternative components and/or implementations may be used.

As illustrated in FIG. 1, the telecommunication system 100 includes multiple terminals (e.g., transmitters) 105 in communication with a gateway (e.g., a receiver) 110. The telecommunication system 100 may implement any telecommunication protocol where multiple communications can be received in the same time and frequency, where a certain error rate may be subject to the current number of communications received, and where adjusting the input profile can maintain the low latency and packet loss profile. An example of such a telecommunication protocol may include the scrambled coded multiple access (SCMA) protocol.

With reference to FIGS. 1 and 2, the terminals 105 may include any electronic device having at least one circuit configured or programmed to wirelessly communicate with the gateway 110 in accordance with any number of telecommunications protocols. Moreover, the terminals 105 may be configured or programmed to communicate in accordance with other telecommunications protocols such as the TDMA or CDMA protocols. The terminals 105 may each include components such as a transmitter 115, a receiver 120, a data storage medium 125, and a processing circuit 130, among others. The transmitter 115 may be configured or programmed to transmit signals to the gateway 110. The receiver 120 may be configured or programmed to receive signals transmitted from the gateway 110 either directly or through an intermediary device such as a satellite 135. The data storage medium 125 may be programmed to store computer-executable instructions. The processing circuit 130 may be programmed to access and execute the computer-executable instructions stored on the data storage medium 125.

In one possible approach, the terminal 105 may be programmed to generate multiple group burst packets for transmission to the gateway 110. For purposes of simplicity, the group burst packets include a first burst packet, a second burst packet, and a third burst packet although similar concepts apply where more than three burst packets are generated and transmitted. Moreover, the "first burst packet" may refer to the first packet in the group and the second and third burst packets may refer to subsequent burst packets, although not necessarily the burst packets that immediately follow the first burst packet in the group. Likewise, the third burst packet may or may not immediately follow the second burst packet in the group.

The terminal 105 may be programmed to generate each burst packet to include a payload. For instance, the first burst packet may include a first payload, the second burst packet may include a second payload, the third burst packet may include a third payload, and so on. The terminal 105 may be programmed to generate only the first burst packet, however, to have headers such as a group header, a burst header, and a packet header. Thus, the terminal 105 may be programmed to generate the second and third burst packets without the group header and potentially without other headers, such as the burst header. Consequently, the subsequent burst packets can be generated with a larger payload since omitting the group header, and possibly other headers, reduces burst overhead.

The terminal 105 may be further programmed to encode each burst packet. The burst packets may be encoded with, e.g., a unique word. The unique word may be associated with a "color", a value, and an associated time slot.

The terminal 105 may be programmed to transmit the encoded burst packets to the gateway 110. The first burst packet may be transmitted at the associated time slot. The second burst packet may be transmitted at a time offset relative to the associated time slot. The third burst packet may be transmitted at the same time offset, although relative to the time at which the second burst packet was transmitted. Thus, the time offset, relative to when the previous burst packet was sent, may be the same for all burst packets after the first burst packet.

With reference to FIGS. 1 and 3, the gateway 110 may include any electronic device having at least one circuit, including a processing circuit 140 and a data storage medium 145. The gateway 110 may be configured or programmed to wirelessly communicate in accordance with a telecommunication protocol associated with the telecommunication system 100. For instance, the gateway 110 may be incorporated into an SCMA telecommunication scheme. The processing circuit 140 may include any computing device, which includes at least one circuit, configured or programmed to access and execute computer-executable instructions stored in the data storage medium 145. The gateway 110 may be configured or programmed to wirelessly communicate with multiple terminals 105. Thus, the gateway 110 may include an antenna 150 or other component used to receive wireless signals. The gateway 110 may, in one possible implementation, communicate with the terminals 105 by way of a satellite 135 in, e.g., geosynchronous orbit with the Earth.

In one possible implementation, the gateway 110 is programmed to receive group burst packets transmitted from the terminal 105. The group burst packets received by the gateway 110 may include the first burst packet, the second burst packet, and the third burst packet, among others, discussed above. The first burst packet may be received with the group header. The second, third, and other burst packets in the group may be received without the group header. All of the burst packets received may be encoded with the unique word, which as discussed above may represent a "color", a value, and an associated time slot.

The gateway 110 may be programmed to associate the burst packets in the group based on the "color" and value associated with the unique word used by the terminal 105 to encode each burst packet. Moreover, the gateway 110 may be programmed to associate the burst packets according to the time at which each burst packet was received. For instance, the gateway 110 may be programmed to identify the first burst packet as the first of a new group of burst packets if the first burst packet is the first in the group (as determined by the "color" and value of the unique word) received by the gateway 110 at the associated time slot. Further, the gateway 110 may identify the first burst packet as that with the group header. The second and third group packets, and any others, may be identified as subsequent burst packets since the second and third burst packets will be received by the gateway 110 at a received time slot, which occurs at a time other than the associated time slot.

Moreover, as discussed above, burst packets after the first burst packet are generated without the group header so the gateway 110 may be programmed to identify subsequent burst packets as those with the same unique word, and received at a time other than the associated time slot, but received without the group header. Because subsequent burst packets omit the group header, and possibly other headers, the gateway 110 need not spend time processing the subsequent burst packets for the group header or other omitted headers.

The gateway 110 may be further programmed to assemble the burst packets. The gateway 110 may be programmed to assemble the burst packets based on the unique word as well as information incorporated into the group header, the burst header, the packet headers, or a combination of these headers. For instance, the gateway 110 may be determined to identify the total number of burst packets in the group from the group header. The gateway 110 may be further programmed to extract the payload from the first burst header and append the payload from the second burst packet, the payload from the third burst packet, and so on, until the payloads from all burst packets in the group have been assembled.

FIG. 4 is a diagram illustrating example packet and burst encapsulation. As shown, the application protocol data units (PDUs) 155 are encapsulated in link layer packets 160, which includes applying a packet header to each PDU segment and a burst header to each burst. The physical layer packets 165 include the encoded link layer packets 160.

Figure 5:
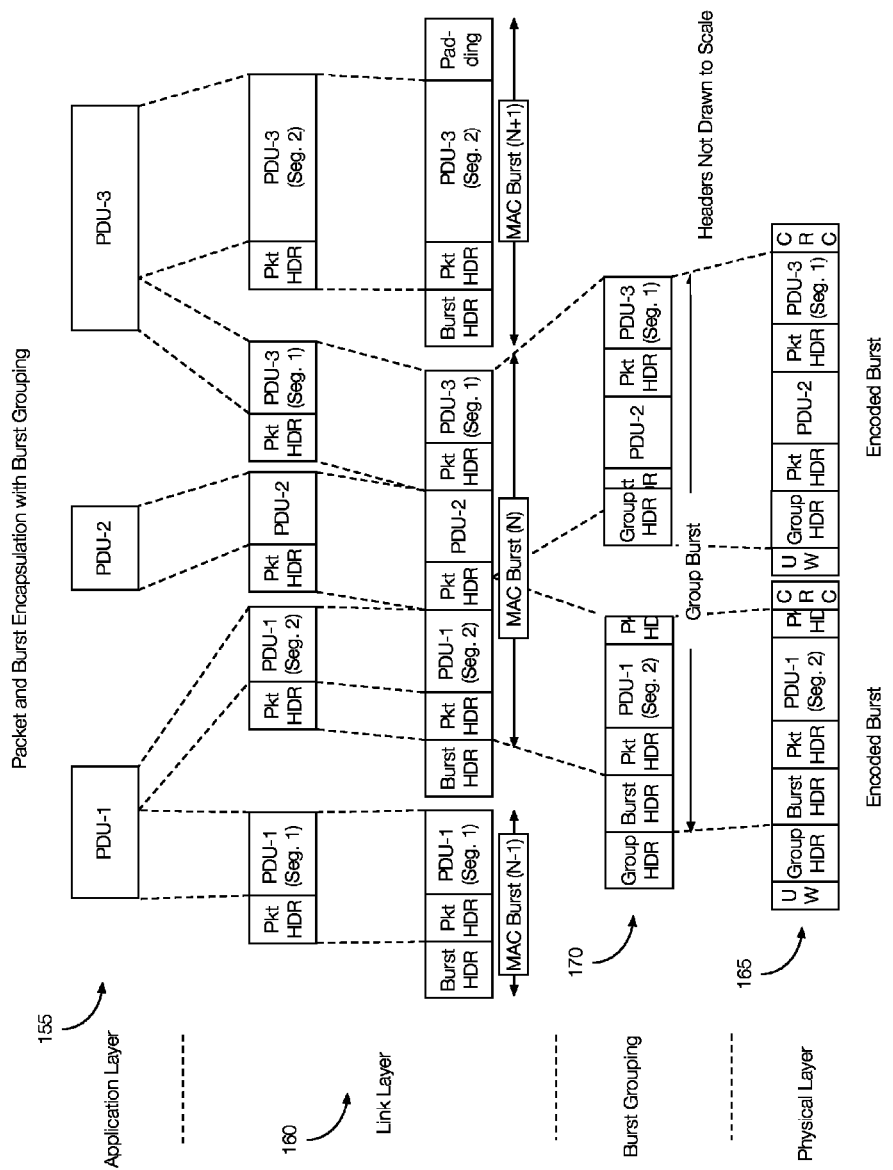
FIG. 5 is a diagram illustrating example packet and burst encapsulation with burst grouping.

FIG. 5 is a diagram illustrating example packet and burst encapsulation with burst grouping. Relative to the approach illustrated in FIG. 4, the group burst packets 170 shown in FIG. 5 are generated after the link layer packets 160. For instance, the group burst packets 170 include the link layer packets 160 but with a group header added. The group burst packets 170 may be encoded to form the physical layer packets 165. As shown, one link layer packet 160 may be broken up into multiple group burst packets 170, each with the group header. Although only two group burst packets 170 are shown, the link layer packets 160 may be broken up into any number of group burst packets 170, each with the group header, which as discussed above creates overhead.

Figure 6:
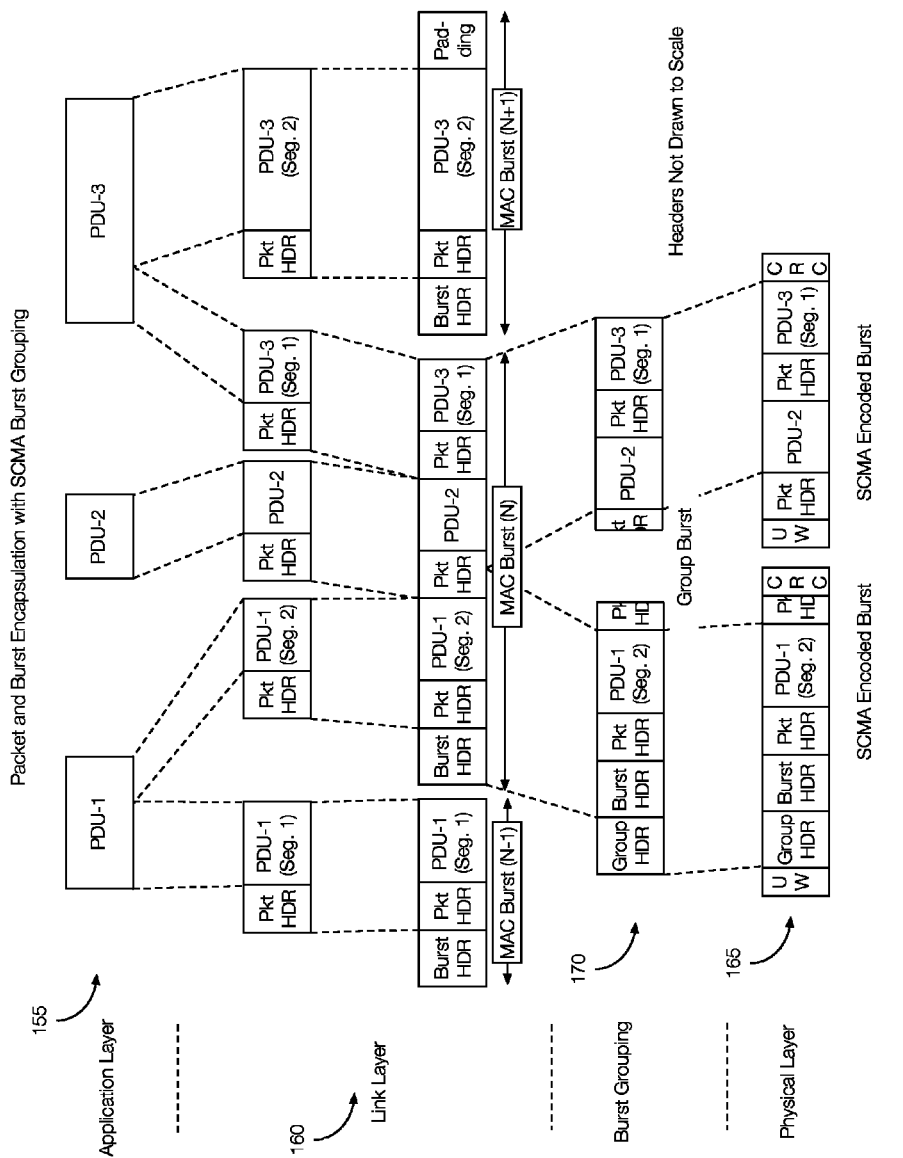
FIG. 6 is a diagram illustrating example packet and burst encapsulation with burst group with reduced overhead.

FIG. 6 is a diagram illustrating example packet and burst encapsulation with burst group with reduced overhead. In FIG. 6, the group burst packets 170 do not all have the group header. Rather, only the first burst packet in the group burst packets 170 includes the group header. Subsequent burst packets in the group burst packets 170 are generated without the group header. The group burst packets 170 may be encoded to form the physical layer packets 165. Encoding the group burst packets 170 may include encoding the group burst packets 170 with the unique word, including the "color" and value. As shown, one link layer packet 160 may be broken up into multiple group burst packets 170, each with the group header. Although only two group burst packets 170 are shown, the link layer packets 160 may be broken up into any number of group burst packets 170. Overhead is reduced relative to the implementation of FIG. 5, however, since not all group burst packets 170 have the group header.

Figure 7:
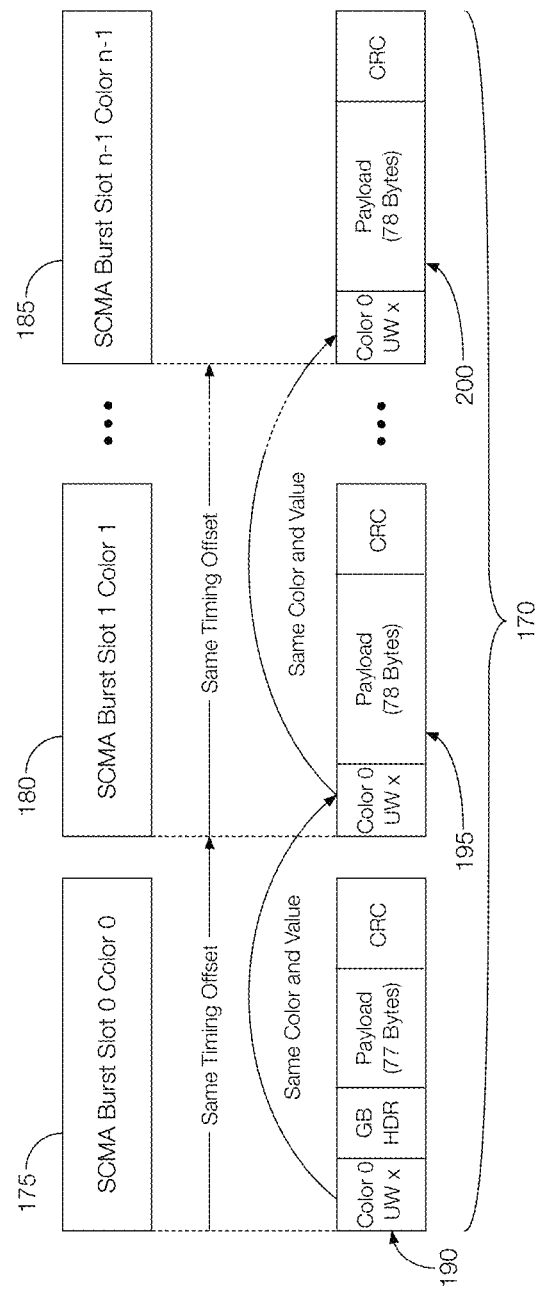
FIG. 7 is a diagram illustrating an example group burst with reduced overhead.

FIG. 7 is a diagram illustrating an example group burst with reduced overhead. Specifically, FIG. 7 illustrates how the encapsulated group burst packets 170 of FIG. 6 (i.e., the physical layer packets 165) can be transmitted at a particular timing offset and distinguished from other physical layer packets 165 part of a different group. The first group 175 is represented as "SCMA Burst Slot 0-Color 0" in FIG. 7. The second group 180 is represented as "SCMA Burst Slot 1-Color 1". The nth group 185 is represented as "SCMA Burst Slot n-1-Color n-1".

Certain burst packets of each group can be transmitted at times designated for packets in other groups. As illustrated in FIG. 7, burst packets associated with the first group 175 are transmitted at times designated for the first group 175, the second group 180, the nth group 185, and so on. The first burst packet 190 includes the unique word, including the "color" and the value associated with the first group 175. Moreover, the first burst packet 190 includes the group header. The second and nth burst packets 195, 200 also include the unique word, including the "color' and value associated with the first group 175, but omit the group header. Moreover, the first burst packet 190 is transmitted at the associated time for the first group 175 while the second burst packet 195 is transmitted after a timing offset, which may mean that the second burst packet 195 is transmitted at a time slot designated for, e.g., the second group 180 or another group. Each burst packet in the first group 175 may be transmitted after the timing offset has elapsed since the previous burst packet in the first group 175 was sent.

The gateway 110 may compare the unique word "color" and value to the time slot at which the burst packet was received. The first burst packet 190 may be the burst packet received at the time slot associated with the first group 175. The gateway 110 may look for the group header in this burst packet. Other burst packets received at time slots designated for different group burst packets 170, but with the unique word "color" and value associated with the first group 175, may be designated by the gateway 110 as part of the first group 175 and combined with the first burst packet 190 and other burst packets designated as part of the first group 175. The gateway 110 may extract the payloads from each burst packet to reconstruct the original data transmitted by the terminal 105.

Figure 8:
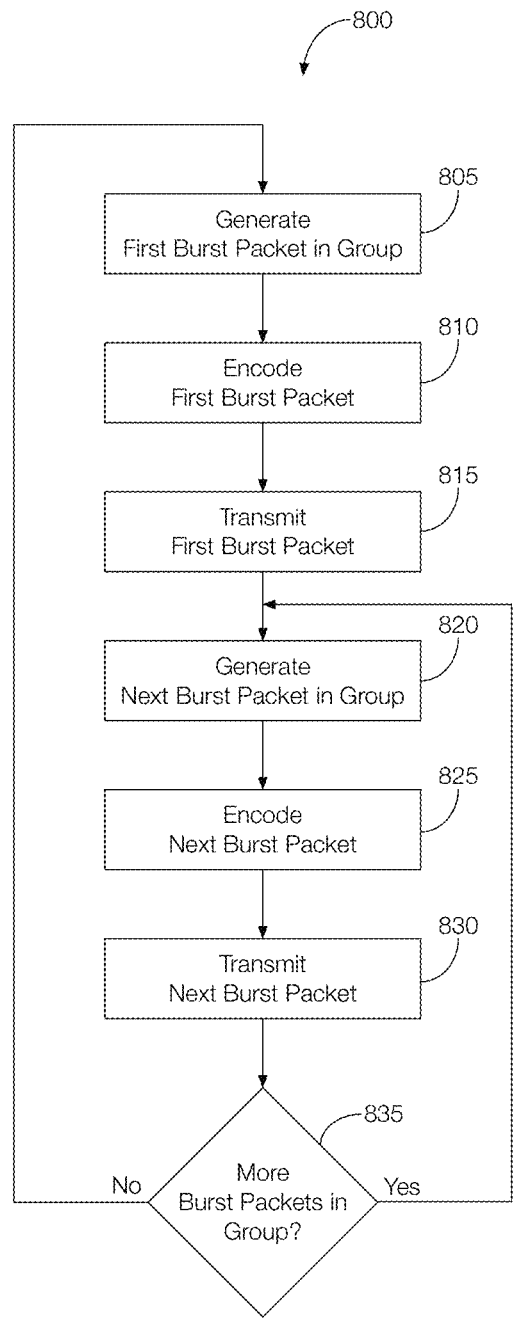
FIG. 8 is a flowchart of an example process that may be executed to transmit burst packets with reduced overhead.

FIG. 8 is a flowchart of an example process 800 that may be executed to transmit burst packets with reduced overhead. The process 800 may be executed by the terminal 105. At block 805, the terminal 105 may generate a first burst packet 190. The first burst packet 190 may be generated with a group header, a burst header, a packet header, and a first payload. At block 810, the terminal 105 may encode the first burst packet 190 with the unique word "color" and value associated with the group in which the burst packets are included. At block 815, the terminal 105 may transmit the encoded first burst packet 190 to the gateway 110 at the associated time slot for the group. At block 820, the terminal 105 may generate a second burst packet 195. The second burst packet 195 may be generated without the group header and without the burst header but may include, e.g., the packet header and a second payload. At block 825, the terminal 105 may encode the second burst packet 195 with the same unique word as the first burst packet 190. At block 830, the terminal 105 may transmit the second burst packet 195 to the gateway 110 at a time other than the associated time slot. For instance, the terminal 105 may transmit the second burst packet 195 a predetermined amount of time (e.g., a timing offset) relative to the time slot at which the first burst packet 190 was transmitted. At decision block 835, the terminal 105 may determine whether to transmit more burst packets as part of the group. If so, the process 800 may proceed to block 820 so that additional burst packets, similar to the second burst packet 195 but with a different payload, may be generated and transmitted at the same timing offset but relative to the time at which the previous burst packet was transmitted. If no more burst packets are to be generated in the current group, the process 800 may return to block 805 so that a new group may be generated and transmitted.

The disclosed concept of coordinating the transmission and receipt of burst packets based on the unique word can be incorporated into an SCMA telecommunication scheme, among others, to, e.g., carry user data for purposes of reducing latency for encrypted web browsing more efficient and practical thereby decreasing latency and improving user traffic.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a network device, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A receiver comprising:
a processing circuit; and
a non-transitory data storage medium,
wherein the processing circuit is programmed to receive a plurality of group burst packets including a first burst packet and a second burst packet, the first burst packet having a group header, and wherein the first burst packet and the second burst packet are encoded with a unique word associated with a color, a value, and an associated time slot; and
wherein the processing circuit is programmed to associate the second burst packet to the first burst packet based on the color and value associated with the unique word used to encode the second burst packet and a received time slot at which the second burst packet is received,
wherein the processing circuit is programmed to determine that the second burst packet is associated with the first burst packet if the received time slot of the second burst packet is different from the associated time slot.

2. The receiver of claim 1, wherein the processing circuit is programmed to determine that the first burst packet represents a new group of burst packets if the first burst packet is received at the associated time slot.

3. The receiver of claim 1, wherein the second burst packet is received without the group header.

4. The receiver of claim 1, wherein the processing circuit is programmed to assemble the first burst packet and the second burst packet based at least in part on the unique word.

5. The receiver of claim 1, wherein the first burst packet and the second burst packet are received according to a timing offset.

6. The receiver of claim 5, wherein the plurality of group burst packets are received according to the timing offset and decoded, and wherein the processing circuit is programmed to reassemble the plurality of group burst packets in an order in which the plurality of group burst packets were transmitted.

7. The receiver of claim 1, wherein the processing circuit is programmed to communicate over a scrambled coded multiple access network.

8. A transmitter comprising:
a processing circuit; and
a non-transitory data storage medium,
wherein the processing circuit is programmed to:
generate a plurality of group burst packets including a first burst packet having a group header and a second burst packet without the group header,
encode the first burst packet and the second burst packet with a unique word associated with a color, a value, and an associated time slot, and
transmit the encoded first burst packet and the encoded second burst packet to a gateway, wherein the processing circuit is programmed to transmit the encoded first burst packet at the associated time slot and the encoded second burst packet according to a time offset relative to the associated time slot.

9. The transmitter of claim 8, wherein the processing circuit is programmed to generate a third burst packet encoded with the unique word and transmit the encoded third burst packet to the gateway according to a time offset relative to the associated time slot.

10. The transmitter of claim 9, wherein the processing circuit is programmed to generate the third burst packet without the group header.

11. The transmitter of claim 8, wherein the processing circuit is programmed to communicate with the gateway over a scrambled coded multiple access network.

12. The transmitter of claim 8, wherein the processing circuit is programmed to generate the first burst packet to include one or more burst headers, one or more packet headers, and a first payload.

13. The transmitter of claim 8, wherein the processing circuit is programmed to generate the second burst packet to include a second payload.

14. The transmitter of claim 8, wherein the processing circuit is programmed to generate the second burst packet without a burst header.

15. A method comprising:
generating a first burst packet having a group header;
generating a second burst packet without the group header;
encoding the first burst packet and the second burst packet with a unique word associated with a color, a value, and an associated time slot; and
transmitting the encoded first burst packet and the encoded second burst packet to a gateway, wherein transmitting the encoded first burst packet and the encoded second burst packet includes transmitting the encoded first burst packet at the associated time slot and transmitting the second burst packet according to a time offset relative to the associated time slot.

16. The method of claim 15, wherein generating the first burst packet includes generating the first burst packet to include a burst header, a packet header, and a first payload.

17. The method of claim 16, wherein generating the second burst packet includes generating the second burst packet to include a second payload and without the burst header.

18. A receiver comprising:
a processing circuit; and
a non-transitory data storage medium,
wherein the processing circuit is programmed to receive a plurality of group burst packets including a first burst packet and a second burst packet, the first burst packet having a group header, and wherein the first burst packet and the second burst packet are encoded with a unique word associated with a color, a value, and an associated time slot; and
wherein the processing circuit is programmed to associate the second burst packet to the first burst packet based on the color and value associated with the unique word used to encode the second burst packet and a received time slot at which the second burst packet is received,
wherein the first burst packet and the second burst packet are received according to a timing offset.

19. A transmitter comprising:
a processing circuit; and
a non-transitory data storage medium,
wherein the processing circuit is programmed to:
generate a plurality of group burst packets including a first burst packet having a group header and a second burst packet without the group header,
encode the first burst packet and the second burst packet with a unique word associated with a color, a value, and an associated time slot,
transmit the encoded first burst packet and the encoded second burst packet to a gateway,
generate a third burst packet encoded with the unique word, and
transmit the encoded third burst packet to the gateway according to a time offset relative to the associated time slot.

20. A method comprising:
generating a first burst packet having a group header;
generating a second burst packet without the group header;
encoding the first burst packet and the second burst packet with a unique word associated with a color, a value, and an associated time slot; and
transmitting the encoded first burst packet and the encoded second burst packet to a gateway,
wherein generating the first burst packet includes generating the first burst packet to include a burst header, a packet header, and a first payload and wherein generating the second burst packet includes generating the second burst packet to include a second payload and without the burst header.

\* \* \* \* \*